United States Patent
Omune (10) Patent No.: US 12,491,853 B2
(45) Date of Patent: Dec. 9, 2025

(54) RESERVOIR TANK AND BRAKE HYDRAULIC PRESSURE GENERATOR

(71) Applicant: ADVICS CO., LTD., Kariya (JP)

(72) Inventor: Takafumi Omune, Kariya (JP)

(73) Assignee: ADVICS CO., LTD., Kariya (JP)

( * ) Notice: Subject to any disclaimer, the term of this patent is extended or adjusted under 35 U.S.C. 154(b) by 0 days.

(21) Appl. No.: 18/867,265

(22) PCT Filed: Jun. 15, 2023

(86) PCT No.: PCT/JP2023/022329
§ 371 (c)(1),
(2) Date: Nov. 19, 2024

(87) PCT Pub. No.: WO2023/243695
PCT Pub. Date: Dec. 21, 2023

(65) Prior Publication Data
US 2025/0319853 A1    Oct. 16, 2025

(30) Foreign Application Priority Data

Jun. 16, 2022 (JP) .................................. 2022-097305

(51) Int. Cl.
*B60T 17/06* (2006.01)
*B60T 11/26* (2006.01)
(Continued)

(52) U.S. Cl.
CPC ............. *B60T 13/148* (2013.01); *B60T 11/26* (2013.01); *B60T 17/06* (2013.01); *F15B 1/26* (2013.01)

(58) Field of Classification Search
CPC .. F15B 1/26; F15B 1/265; B60T 11/26; B60T 13/148; B60T 17/06
See application file for complete search history.

(56) References Cited

U.S. PATENT DOCUMENTS

| | | | | |
|---|---|---|---|---|
| 6,105,611 A | * | 8/2000 | Ando | B60T 11/26 137/574 |
| 8,607,563 B2 | * | 12/2013 | Takahashi | B60T 11/26 60/592 |

(Continued)

FOREIGN PATENT DOCUMENTS

JP    2010069977 A    4/2010

OTHER PUBLICATIONS

International Search Report (PCT/ISA/210) with translation and Written Opinion (PCT/ISA/237) mailed on Aug. 8, 2023, by the Japanese Patent Office as the International Searching Authority for International Application No. PCT/JP2023/022329 (8 pages).

*Primary Examiner* — Michael Leslie
(74) *Attorney, Agent, or Firm* — BUCHANAN INGERSOLL & ROONEY PC (57) ABSTRACT

As an example, a reservoir tank according to an embodiment includes: an upper case; a lower case coupled to the upper case; a partition wall extending from the upper case toward the lower case and separating, in a horizontal direction, first and second rooms which are included in a space inside the upper case and the lower case; and a partition member having a first wall covering the first room from below, and a second wall protruding upward from the first wall and being in contact with the partition wall. The partition wall includes a first slit opening to a lower edge of the partition wall and establishing communication between the first and second rooms, and at least an edge of the first slit and the second wall forming a first hole which establishes communication between the first and second rooms and which is positioned above the first wall.

8 Claims, 5 Drawing Sheets

(51) Int. Cl.
*B60T 13/14* (2006.01)
*F15B 1/26* (2006.01)

(56) References Cited

U.S. PATENT DOCUMENTS

| | | | |
|---|---|---|---|
| 9,139,182 B2 * | 9/2015 | Tandler | B60T 11/26 |
| 10,759,406 B2 * | 9/2020 | Motegi | G01F 23/74 |
| 11,052,890 B2 * | 7/2021 | Spencer | B60T 11/26 |
| 11,993,233 B2 * | 5/2024 | Kim | B60T 13/142 |
| 2011/0227405 A1 * | 9/2011 | Takahashi | B60T 11/22 |
| | | | 220/675 |
| 2012/0292982 A1 * | 11/2012 | Takahashi | H01H 36/02 |
| | | | 303/6.01 |
| 2021/0179049 A1 * | 6/2021 | Ishii | B60T 11/26 |

* cited by examiner

RESERVOIR TANK AND BRAKE HYDRAULIC PRESSURE GENERATOR

TECHNICAL FIELD

Embodiments of the present disclosure relate to a reservoir tank and a brake hydraulic pressure generator.

BACKGROUND ART

In the related art, a reservoir tank in which an internal space is partitioned into a plurality of rooms is known (PTL 1). For example, the plurality of rooms individually store a fluid and communicate with one another such that the fluid flows through a desired passage.

CITATION LIST

Patent Literature

PTL 1: JP2010-69977A

SUMMARY

Technical Problem

However, in a configuration in the related art, an arrangement of a hole that establishes communication between two of the rooms may be limited. For example, when the hole is formed by injection molding using a slide core, a design of the reservoir tank is limited such that the reservoir tank provides a portion in which the slide core is movable.

Therefore, the disclosure has been made in view of the above, and an object of the disclosure is to provide a reservoir tank and a brake hydraulic pressure generator whose degree of freedom in design can be improved.

Solution to Problem

As an example, a reservoir tank according to an embodiment of the disclosure includes: an upper case; a lower case positioned below the upper case and coupled to the upper case; a partition wall extending from the upper case toward the lower case and separating, in a horizontal direction, a first room and a second room which are included in a space inside the upper case and the lower case coupled to each other; and a partition member having a first wall covering the first room from below, and a second wall protruding upward from the first wall and being in contact with the partition wall. The partition wall is provided with a first slit which opens to a lower edge of the partition wall and which establishes communication between the first room and the second room, and at least an edge of the first slit and the second wall form a first hole which establishes communication between the first room and the second room and which is positioned above the first wall. Therefore, as an example, in the reservoir tank, the first hole having a high degree of freedom in arrangement can be formed by a combination of the first slit and the partition member. Accordingly, a degree of freedom in design of the reservoir tank can be improved.

DESCRIPTION OF EMBODIMENTS

Hereinafter, one embodiment will be described with reference to FIGS. 1 to 5. In the present description, basically, a vertically upward direction is defined as an upper direction, and a vertically downward direction is defined as a lower direction. In the present description, a component according to the embodiment and description of the component may be described in a plurality of expressions. The component and the description thereof are merely examples, and are not limited to the expressions in the present description. The component may be identified by a name different from that described in the present description. The component may be described by an expression different from the expression in the present description.

Figure 1:
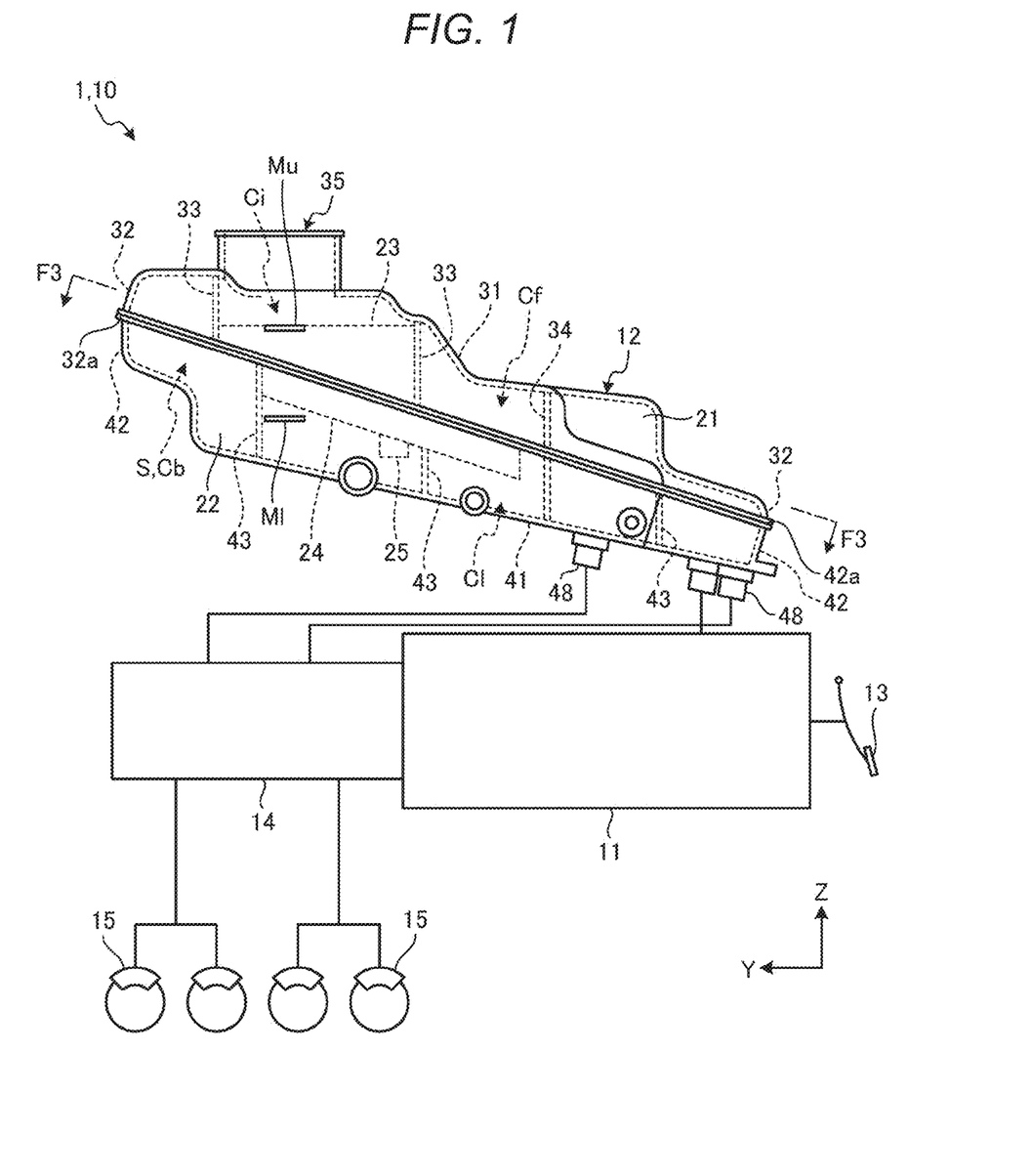
FIG. 1 is a diagram schematically showing a brake hydraulic pressure generator according to an embodiment.

FIG. 1 is a diagram schematically showing a brake hydraulic pressure generator 10 according to the present embodiment. The brake hydraulic pressure generator 10 is mounted on a vehicle 1 such as an automobile. The brake hydraulic pressure generator 10 generates a pressure (hydraulic pressure) of a brake fluid in each of fluid passages of a brake device of the vehicle 1. The brake hydraulic pressure generator 10 is not limited to this example.

As shown in FIG. 1, the brake hydraulic pressure generator 10 includes a hydro-booster 11, a reservoir tank 12, a brake pedal 13, and a master cylinder 14. The hydro-booster 11 is an example of a pressure adjustment device. The pressure adjustment device may be another component capable of pressurizing or depressurizing the brake fluid, such as the master cylinder 14. The brake hydraulic pressure generator 10 may further include various devices such as a pump.

The hydro-booster 11 is a brake booster and is connected to the fluid passages of the brake device. The hydro-booster 11 amplifies a pedaling force on the brake pedal 13 to pressurize the brake fluid in the master cylinder 14.

For example, the master cylinder 14 is connected to a plurality of wheel cylinders 15 via the fluid passages of the brake device. When the brake fluid in the master cylinder 14 is pressurized, a brake pad connected to the wheel cylinders 15 is pressed against a brake disc to exert a braking force. The brake hydraulic pressure generator 10 is not limited to being mounted on a disc brake, and may be mounted on other brake devices such as a drum brake.

The reservoir tank 12 is connected to the hydro-booster 11. The reservoir tank 12 stores the brake fluid therein. The brake fluid in the reservoir tank 12 is supplied to the hydro-booster 11. The brake fluid discharged from the hydro-booster 11 can be stored in the reservoir tank 12. The reservoir tank 12 may be further connected to other devices such as the master cylinder 14 and the pump.

As shown in the drawings, an X axis, a Y axis, and a Z axis are defined for convenience in the present description. The X axis, the Y axis, and the Z axis are orthogonal to one another. The X axis is provided along a width of the reservoir tank 12. The Y axis is provided along a length of the reservoir tank 12. The Z axis is provided along a height of the reservoir tank 12.

Further, an X direction, a Y direction, and a Z direction are defined in the present description. The X direction is a direction along the X axis and includes a +X direction indicated by an arrow of the X axis and a −X direction opposite to the direction indicated by the arrow of the X axis. The Y direction is a direction along the Y axis and includes a +Y direction indicated by an arrow of the Y axis and a −Y direction opposite to the direction indicated by the arrow of the Y axis. The Z direction is a direction along the Z axis and includes a +Z direction indicated by an arrow of the Z axis and a −Z direction opposite to the direction indicated by the arrow of the Z axis.

The reservoir tank 12 in a state where the vehicle 1 is placed on a horizontal ground will be described below. In this case, the +Z direction is the upper direction, and the −Z direction is the lower direction. The reservoir tank 12 may be mounted on the brake hydraulic pressure generator 10 such that the Z direction is slightly different from a vertical direction.

Figure 2:
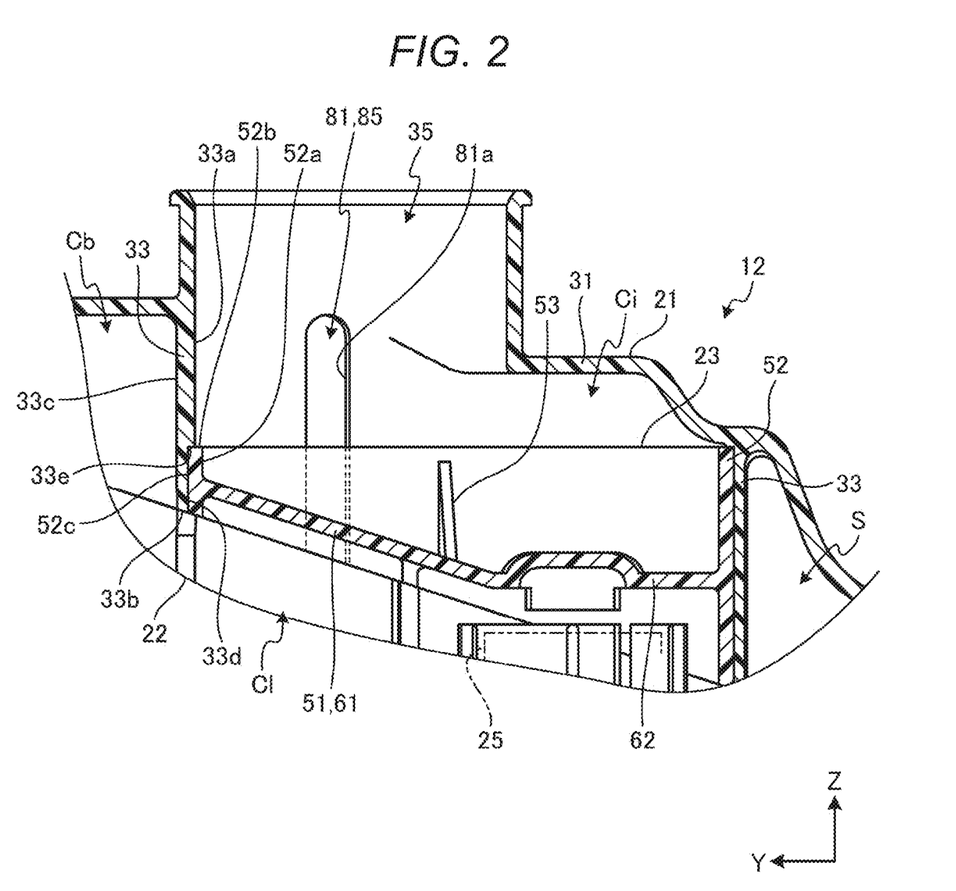
FIG. 2 is a cross-sectional view showing a part of a reservoir tank according to the embodiment.
Figure 3:
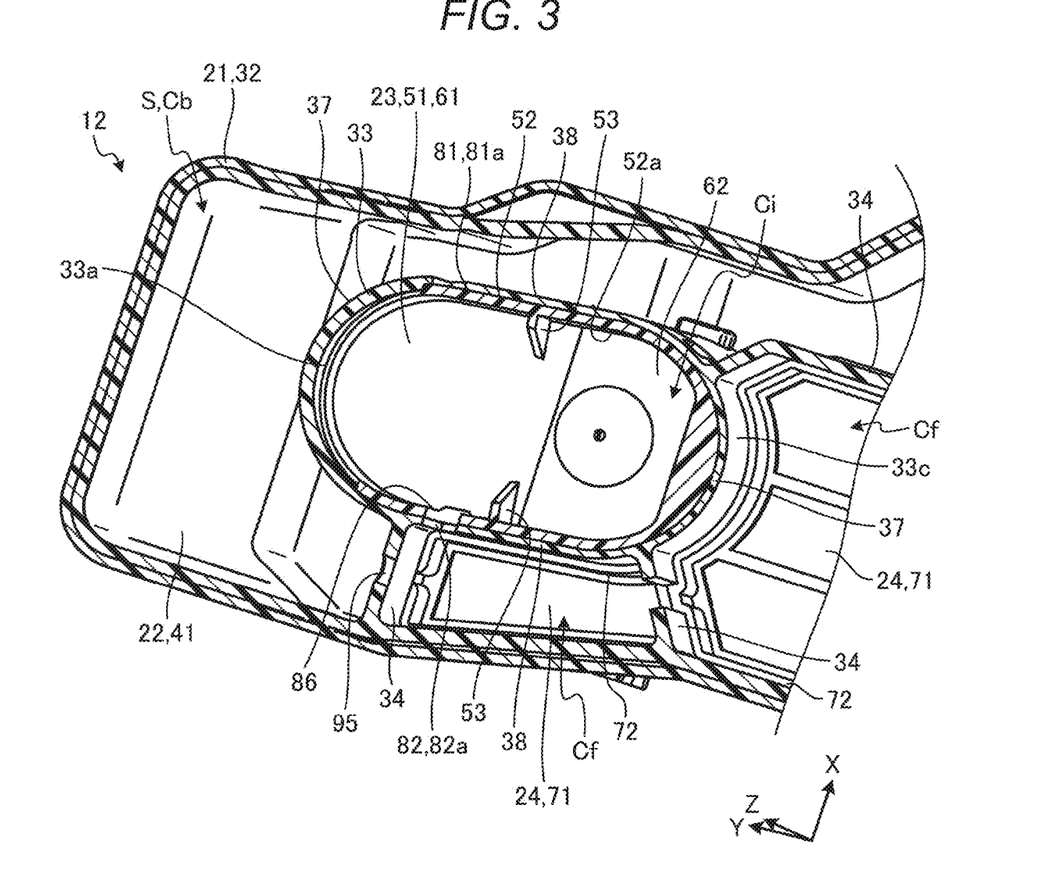
FIG. 3 is a perspective view showing a cross section of the reservoir tank according to the embodiment taken along a line F3-F3 in FIG. 1.

FIG. 2 is a cross-sectional view showing a part of the reservoir tank 12 according to the present embodiment. FIG. 3 is a perspective view showing a cross section of the reservoir tank 12 according to the present embodiment taken along a line F3-F3 in FIG. 1. As shown in FIGS. 1 to 3, the reservoir tank 12 includes an upper case 21, a lower case 22, an inner cap 23, a plurality of filters 24, and a float 25. The inner cap 23 is an example of a partition member.

The upper case 21, the lower case 22, the inner cap 23, and the filters 24 are made of a synthetic resin such as polypropylene and polyethylene. At least one of the upper case 21, the lower case 22, the inner cap 23, and the filters 24 may be made of another material.

The upper case 21, the lower case 22, the inner cap 23, and the filters 24 are coupled to one another by, for example, welding. For example, the upper case 21 and the inner cap 23 are coupled to each other, and the lower case 22 and the filters 24 are coupled to each other. Further, the upper case 21 is coupled to the lower case 22 positioned below the upper case 21. The upper case 21 and the lower case 22 coupled to each other are formed in a box shape, and a space S is provided therein.

As shown in FIG. 1, the upper case 21 includes an upper wall 31, a side wall 32, and a plurality of partition walls 33 and 34. The upper wall 31, the side wall 32, and the partition walls 33 and 34 are integrally formed. The upper wall 31, the side wall 32, and the partition walls 33 and 34 may be members different from one another.

The upper wall 31 is provided with an oilhole 35. The oilhole 35 penetrates the upper wall 31 substantially in the Z direction and establishes communication between the space S and an outside of the reservoir tank 12. The reservoir tank 12 can be supplied with the brake fluid from the oilhole 35. The oilhole 35 is closed by, for example, a cap.

The side wall 32 extends substantially in the −Z direction from an edge of the upper wall 31. That is, the side wall 32 extends from the upper case 21 toward the lower case 22. The side wall 32 extends endlessly from the edge of the upper wall 31 along the edge of the upper wall 31. In other words, the side wall 32 is formed in a tubular shape. The side wall 32 surrounds the space S.

An edge 32a of the side wall 32 in the −Z direction (lower direction) is obliquely inclined with respect to a horizontal direction. In the present embodiment, the edge 32a of the side wall 32 in the −Z direction is inclined obliquely downward with respect to the −Y direction and extends obliquely rightward and downward in FIG. 1. The edge 32a of the side wall 32 in the −Z direction is provided on substantially the same plane. The edge 32a of the side wall 32 in the −Z direction is not limited to this example.

The plurality of partition walls 33 and 34 extend substantially in the −Z direction from the upper wall 31. That is, the partition walls 33 and 34 extend from the upper case 21 toward the lower case 22. The partition walls 33 and 34 may extend in a direction obliquely inclined with respect to the vertical direction. The partition walls 33 and 34 partition a portion of the space S inside the upper case 21 into a plurality of rooms in the horizontal direction.

As shown in FIG. 3, the partition wall 33 is separated from the side wall 32. The partition wall 33 is formed in a substantially elliptical cylindrical shape elongated in the Y direction. For example, the partition wall 33 includes two arc-shaped portions 37 and two linear portions 38 positioned between the two arc-shaped portions. A shape of the partition wall 33 is not limited to this example. The partition wall 34 extends, for example, between the side wall 32 and the partition wall 33.

As shown in FIG. 1, the lower case 22 includes a lower wall 41, a side wall 42, and a plurality of partition walls 43. The lower wall 41, the side wall 42, and the partition walls 43 are integrally formed. The lower wall 41, the side wall 42, and the partition walls 43 may be members different from one another.

The lower wall 41 is positioned below the upper case 21. The side wall 42 extends substantially in the +Z direction from an edge of the lower wall 41. The side wall 42 extends endlessly from the edge of the lower wall 41 along the edge of the lower wall 41. In other words, the side wall 42 is formed in a tubular shape. The side wall 42 surrounds the space S.

An edge 42a of the side wall 42 in the +Z direction (upper direction) is obliquely inclined with respect to the horizontal direction along the edge 32a of the side wall 32 of the upper case 21. The edge 42a of the side wall 42 in the +Z direction is provided on substantially the same plane. The edge 42a of the side wall 42 in the +Z direction is not limited to this example.

The edge 42a of the side wall 42 is in contact with the edge 32a of the side wall 32. When the edge 32a of the side wall 32 and the edge 42a of the side wall 42 are welded to each other, the upper case 21 and the lower case 22 are coupled to each other. The upper case 21 and the lower case 22 may be coupled to each other by another method.

A plurality of ports 48 are provided in the lower wall 41 and the side wall 42. Each of the ports 48 penetrates the lower wall 41 or the side wall 42, and establishes communication between the space S and the outside of the reservoir tank 12. The ports 48 are connected to the master cylinder 14 and the hydro-booster 11 via, for example, the fluid passages of the brake device. At least one of the plurality of ports 48 may be connected to another device.

The plurality of partition walls 43 extend substantially in the +Z direction from the lower wall 41. The partition walls 43 may extend in the direction obliquely inclined with respect to the vertical direction. The partition walls 43 partition a portion of the space S inside the lower case 22 into a plurality of rooms in the horizontal direction.

The inner cap 23 is disposed in the space S. The inner cap 23 is inserted inside the partition wall 33 of the upper case 21, for example, from below. The inner cap 23 is not limited to this example.

Figure 4:
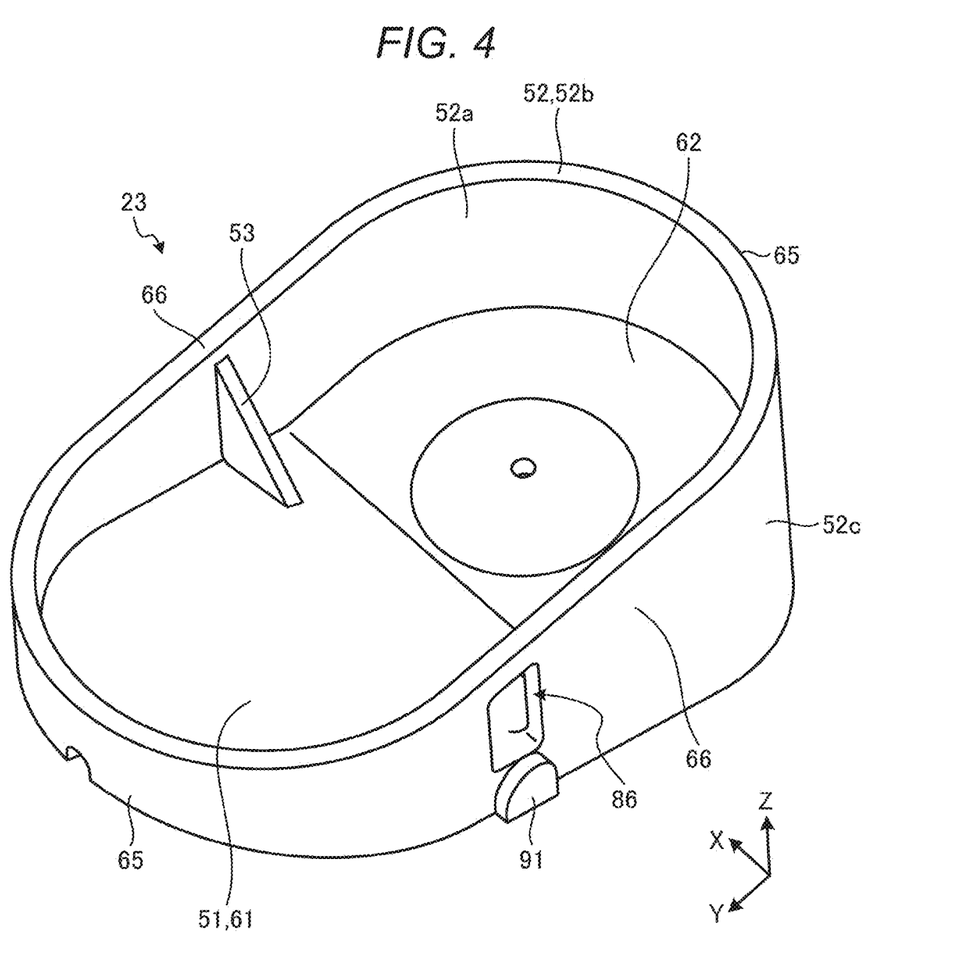
FIG. 4 is a perspective view showing an inner cap according to the embodiment.

FIG. 4 is a perspective view showing the inner cap 23 according to the present embodiment. As shown in FIG. 4, the inner cap 23 includes a bottom wall 51, a peripheral wall 52, and a plurality of ribs 53. The bottom wall 51 is an example of a first wall. The peripheral wall 52 is an example of a second wall.

The bottom wall 51 is formed in a substantially elliptical plate shape elongated in the Y direction. The bottom wall 51 includes an inclined portion 61 and a horizontal portion 62. The inclined portion 61 is substantially parallel to the edges 32a and 42a of the side walls 32 and 42 and inclined obliquely downward with respect to the −Y direction. The horizontal portion 62 extends substantially in the −Y direction from an end portion of the inclined portion 61 in the −Y direction.

The peripheral wall 52 protrudes upward from the bottom wall 51, for example, toward the upper wall 31 of the upper case 21. In the present embodiment, the peripheral wall 52 protrudes in the +Z substantially direction from an edge of the bottom wall 51 and extends endlessly along the edge of the bottom wall 51 and the partition wall 33. In other words, the peripheral wall 52 is formed in a substantially elliptical cylindrical shape elongated in the Y direction. For example, the peripheral wall 52 includes two arc-shaped portions 65 and two linear portions 66 positioned between the two arc-shaped portions.

As shown in FIG. 2, the partition wall 33 has a first inner surface 33a, a lower edge 33b, an outer surface 33c, a second inner surface 33d, and a step 33e. The lower edge 33b is an example of an edge of the partition wall in the lower direction.

The first inner surface 33a is a substantially elliptical cylindrical curved surface facing an inside of the tubular partition wall 33. The lower edge 33b is an edge of the partition wall 33 in the −Z direction. The lower edge 33b is obliquely inclined with respect to the horizontal direction along the edge 32a of the side wall 32. The lower edge 33b is provided on substantially the same plane as the edge 32a of the side wall 32. The lower edge 33b is not limited to this example.

The outer surface 33c is a substantially elliptical cylindrical curved surface facing an outside of the tubular partition wall 33. The outer surface 33c is positioned opposite to the first inner surface 33a. An end of the outer surface 33c in the −Z direction is connected to the lower edge 33b. Meanwhile, an end of the first inner surface 33a in the −Z direction is positioned above the lower edge 33b.

The second inner surface 33d is positioned opposite to the outer surface 33c and is positioned at least partially below the first inner surface 33a. The second inner surface 33d is a substantially elliptical cylindrical curved surface facing the inside of the tubular partition wall 33. An end of the second inner surface 33d in the −Z direction is connected to the lower edge 33b.

The second inner surface 33d is positioned between the first inner surface 33a and the outer surface 33c in the horizontal direction. That is, a portion of the partition wall 33 between the second inner surface 33d and the outer surface 33c is thinner than a portion of the partition wall 33 between the first inner surface 33a and the outer surface 33c.

The step 33e is connected to the end of the first inner surface 33a in the −Z direction and an end of the second inner surface 33d in the +Z direction. The step 33e is a substantially horizontal plane and faces substantially the −Z direction. The step 33e may be obliquely inclined with respect to the horizontal direction.

The peripheral wall 52 is fitted into an inside of the second inner surface 33d and is in contact with the step 33e. The peripheral wall 52 has an inner surface 52a, an upper edge 52b, and an outer surface 52c.

The inner surface 52a is a substantially elliptical cylindrical curved surface facing an inside of the tubular peripheral wall 52. The upper edge 52b is an edge of the peripheral wall 52 in the +Z direction. The upper edge 52b is a substantially horizontal plane and faces substantially the +Z direction. The upper edge 52b is in contact with the step 33e of the partition wall 33.

The upper edge 52b of the peripheral wall 52 and the step 33e of the partition wall 33 may be partially obliquely inclined with respect to the horizontal direction along the edge 32a of the side wall 32 of the upper case 21. In this case, the upper case 21, the lower case 22, and the inner cap 23 are easily welded.

The outer surface 52c is a substantially elliptical cylindrical curved surface facing an outside of the tubular peripheral wall 52. The outer surface 52c is positioned opposite to the inner surface 52a and is in contact with the second inner surface 33d of the partition wall 33. A gap may be provided between the outer surface 52c and the second inner surface 33d.

The portion of the partition wall 33 between the second inner surface 33d and the outer surface 33c surrounds the peripheral wall 52. In other words, the partition wall 33 and the peripheral wall 52 at least partially overlap in the horizontal direction. The partition wall 33 may not overlap the peripheral wall 52.

As shown in FIG. 4, each of the ribs 53 is formed in a substantially triangular plate shape and connects the inclined portion 61 of the bottom wall 51 and the peripheral wall 52. The rib 53 is connected to, for example, the linear portion 66 of the peripheral wall 52. Accordingly, the rib 53 can prevent the linear portion 66 from falling down. The rib 53 is not limited to this example.

As shown in FIG. 3, the filters 24 are disposed in the space S. The filters 24 are inserted, for example, from above into a portion of the space S between the side wall 42 and the partition walls 43 of the lower case 22. The filter 24 is not limited to this example.

The filter 24 has a filter wall 71 and a peripheral wall 72. The filter wall 71 is provided substantially horizontally. The filter wall 71 is at least partially formed in a mesh shape. The brake fluid is filtered by the filter wall 71 and can pass through the filter wall 71. The peripheral wall 72 extends substantially in the −Z direction from an edge of the filter wall 71. For example, a protrusion protruding from the peripheral wall 72 is fitted into a notch provided in the partition wall 43. Accordingly, the lower case 22 supports the filters 24.

The space S includes an introduction room Ci, a filter room Cf, and a bypass room Cb. The introduction room Ci is an example of a first room. The filter room Cf is an example of a third room. The bypass room Cb is an example of a second room.

The introduction room Ci is a part of the space S provided inside the partition wall 33 and the peripheral wall 52. The partition wall 33 and the peripheral wall 52 surround the introduction room Ci. Each of the filter room Cf and the bypass room Cb is a part of the space S provided outside the partition wall 33 and between the side wall 32 and the partition wall 33.

The partition wall 33 and the peripheral wall 52 separate the introduction room Ci and the filter room Cf in the horizontal direction. The partition wall 33 and the peripheral wall 52 separate the introduction room Ci and the bypass room Cb in the horizontal direction. One of the plurality of partition walls 34 separates the filter room Cf and the bypass room Cb in the horizontal direction.

As shown in FIG. 2, the bottom wall 51 of the inner cap 23 covers the introduction room Ci from below. The introduction room Ci is formed (divided, defined) by the upper wall 31, the partition wall 33, and the bottom wall 51. The introduction room Ci is not limited to this example. The introduction room Ci communicates with the outside of the reservoir tank 12 via the oilhole 35.

The space S further includes a plurality of lower rooms Cl. The lower rooms Cl are a part of the space S provided inside the lower case 22. The bottom wall 51 of the inner cap 23 separates the introduction room Ci and at least one of the plurality of lower rooms Cl in the vertical direction. The filter wall 71 of the filter 24 separates the filter room Cf and at least one of the plurality of lower rooms Cl in the vertical direction. The filter room Cf and the lower room Cl communicate with each other through a mesh of the filter wall 71. The bypass room Cb communicates with at least one of the plurality of lower rooms Cl. At least one of the plurality of lower rooms Cl communicates with the outside of the reservoir tank 12 via the ports 48.

The float 25 is disposed in the lower room Cl. The float 25 is positioned between the lower wall 41 and the horizontal portion 62 of the bottom wall 51. The float 25 floats on the brake fluid stored in the reservoir tank 12. The horizontal portion 62 is in contact with the float 25 to limit the float 25 from moving in the +Z direction.

For example, a magnet is attached to the float 25. The brake hydraulic pressure generator 10 further includes a sensor that detects a position of the float 25 in the vertical direction based on a magnetic force of the magnet. The brake hydraulic pressure generator 10 can detect a fluid level of the brake fluid stored in the reservoir tank 12 by detecting the position of the float 25.

Figure 5:
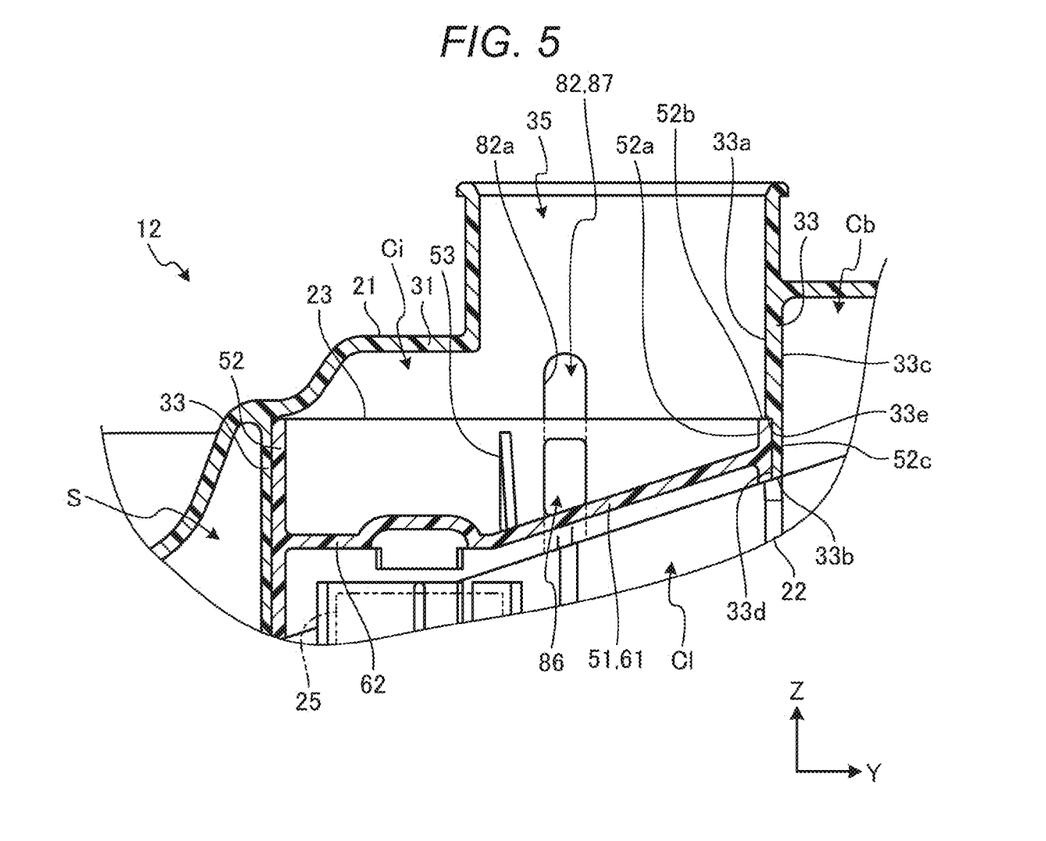
FIG. 5 is a cross-sectional view showing a part of the reservoir tank according to the embodiment from an opposite side in FIG. 2.

FIG. 5 is a cross-sectional view showing a part of the reservoir tank 12 according to the present embodiment from an opposite side in FIG. 2. The partition wall 33 is provided with a first slit 81 shown in FIG. 2 and a second slit 82 shown in FIG. 5. Each of the first slit 81 and the second slit 82 opens to the lower edge 33b of the partition wall 33 and extends from the lower edge 33b substantially in the +Z direction. The first slit 81 and the second slit 82 may extend in other directions.

Each of the first slit 81 and the second slit 82 penetrates the partition wall 33 in a substantially horizontal direction, and opens to the first inner surface 33a, the outer surface 33c, the second inner surface 33d, and the step 33e of the partition wall 33.

As shown in FIG. 3, the first slit 81 establishes communication between the introduction room Ci and the bypass room Cb. The rib 53 is positioned between the first slit 81 and the horizontal portion 62 in the Y direction. The second slit 82 establishes communication between the introduction room Ci and the filter room Cf. The second slit 82 is positioned in the Y direction between the horizontal portion 62 and the partition wall 34 that separates the filter room Cf and the bypass room Cb. Further, the rib 53 is positioned between the second slit 82 and the horizontal portion 62 in the Y direction.

As described above, the peripheral wall 52 of the inner cap 23 is in contact with the second inner surface 33d and the step 33e. Therefore, the peripheral wall 52 closes a portion of the first slit 81 that opens to the second inner surface 33d and a portion of the first slit 81 that opens to the step 33e.

As shown in FIG. 2, at least an edge 81a of the first slit 81 and the upper edge 52b of the peripheral wall 52 form a first hole 85. The first hole 85 is a part of the first slit 81. That is, the peripheral wall 52 narrows the first slit 81 to form the first hole 85.

As shown in FIG. 5, a second hole 86 is provided in the peripheral wall 52. The second hole 86 penetrates the peripheral wall 52 in the substantially horizontal direction and opens to the inner surface 52a and the outer surface 52c. The second hole 86 is provided at a position adjacent to the bottom wall 51 and is positioned below the upper edge 52b of the peripheral wall 52. The second hole 86 communicates with a portion of the second slit 82 that opens to the second inner surface 33d. The second hole 86 establishes communication between the introduction room Ci and the filter room Cf via the second slit 82.

The second hole 86 is separated downward from the upper edge 52b of the peripheral wall 52. Therefore, a portion of the peripheral wall 52 adjacent to the upper edge 52b does not break due to the second hole 86, and endlessly extends to prevent a decrease in strength.

At least an edge 82a of the second slit 82 and the upper edge 52b of the peripheral wall 52 form a third hole 87. The third hole 87 is a part of the second slit 82. That is, the peripheral wall 52 narrows the second slit 82 to form the third hole 87.

Similarly to the first slit 81, the first hole 85 establishes communication between the introduction room Ci and the bypass room Cb. Similarly to the second slit 82, the third hole 87 establishes communication between the introduction room Ci and the filter room Cf.

Each of the first hole 85 and the third hole 87 is positioned above the bottom wall 51, and is positioned above the upper edge 52b of the peripheral wall 52 with the upper edge 52b as a lower end. Further, each of the first hole 85 and the third hole 87 is positioned above the lower edge 33b of the partition wall 33. The second hole 86 is positioned below the first hole 85 and the third hole 87. An upper end of the second hole 86 may extend to, for example, the upper edge 52b of the peripheral wall 52 instead of the above-described example. That is, the second hole 86 may have a slit shape with an open upper end.

As shown in FIG. 4, the inner cap 23 further includes a protrusion 91 protruding in a substantially horizontal direction from the outer surface 52c of the peripheral wall 52. The protrusion 91 is fitted to the portion of the second slit 82 that opens to the second inner surface 33d. The protrusion 91 assists positioning of the inner cap 23.

For example, the brake fluid is supplied from the oilhole 35 to the introduction room Ci. The brake fluid in the introduction room Ci flows out to the filter room Cf through the second hole 86. However, since the first hole 85 and the third hole 87 are positioned on the upper edge 52b of the peripheral wall 52, the brake fluid normally does not flow out of the introduction room Ci from the first hole 85 and the third hole 87.

The brake fluid in the filter room Cf passes through the filter wall 71 and is supplied to at least one of the plurality of lower rooms Cl. The brake fluid in the lower rooms Cl is supplied from the ports 48 to the master cylinder 14, the hydro-booster 11, or other devices.

On the other hand, for example, when clogging occurs in the filter 24, the brake fluid in the filter room Cf hardly passes through the filter wall 71. In this case, the brake fluid accumulates in the filter room Cf and the introduction room Ci, and the fluid level of the brake fluid in the introduction room Ci rises.

When the fluid level of the brake fluid in the introduction room Ci rises and exceeds the upper edge 52b of the peripheral wall 52, the brake fluid flows out to the bypass room Cb through the first hole 85. The brake fluid in the bypass room Cb is supplied to, for example, the lower room Cl without being filtered. In this manner, even when the clogging occurs in the filter 24, the brake fluid in the introduction room Ci can be supplied to the lower room Cl. Accordingly, a shortage of the brake fluid in the master cylinder 14 and the hydro-booster 11 is prevented.

As shown in FIG. 1, the upper case 21 is provided with an upper limit scale Mu. The upper limit scale Mu is provided at substantially the same height as the upper edge 52b of the peripheral wall 52. A user supplies the brake fluid to the oilhole 35 such that the fluid level of the brake fluid in the introduction room Ci does not exceed the upper limit scale Mu, thereby preventing a supply of the brake fluid that is not filtered to the lower room Cl.

The lower case 22 is provided with a lower limit scale Ml. When the fluid level of the brake fluid in the space S is lowered, the position of the float 25 is also lowered. For example, an electronic control unit (ECU) of the vehicle 1 can determine whether the fluid level of the brake fluid in the space S is lower than the lower limit scale Ml based on detection of the position of the float 25 by the sensor.

As shown in FIG. 3, a fourth hole 95 may be provided in the partition wall 34 that separates the filter room Cf and the bypass room Cb. The fourth hole 95 is provided at substantially the same height as the first hole 85, and establishes communication between the filter room Cf and the bypass room Cb. When the clogging occurs in the filter 24, the brake fluid accumulated in the filter room Cf can flow out to the bypass room Cb through the fourth hole 95.

In the brake hydraulic pressure generator 10 according to the embodiment described above, the partition wall 33 extends from the upper case 21 toward the lower case 22, and separates, in the horizontal direction, the introduction room Ci and the bypass room Cb included in the space S inside the upper case 21 and the lower case 22 coupled to each other. The inner cap 23 includes the bottom wall 51 and the peripheral wall 52. The bottom wall 51 covers the introduction room Ci from below. The peripheral wall 52 protrudes upward from the bottom wall 51 and is in contact with the partition wall 33. The partition wall 33 is provided with the first slit 81 that opens to the lower edge 33b of the partition wall 33 and that establishes communication between the introduction room Ci and the bypass room Cb. At least the edge 81a of the first slit 81 and the peripheral wall 52 form the first hole 85 that establishes communication between the introduction room Ci and the bypass room Cb and is positioned above the bottom wall 51. A distance between the bottom wall 51 and the first hole 85 in the vertical direction can be easily changed by, for example, changing a length of the peripheral wall 52. Meanwhile, when a hole that establishes communication between the introduction room Ci and the bypass room Cb is formed by, for example, injection molding using a slide core, a design of the reservoir tank 12 is limited such that the reservoir tank 12 provides a portion (movement space of the slide core) in which the slide core is movable. However, in the reservoir tank 12, the first hole 85 having a high degree of freedom in arrangement can be formed by a combination of the first slit 81 and the inner cap 23. Accordingly, a degree of freedom in design of the reservoir tank 12 can be improved. For example, the structure according to the present embodiment is particularly useful when it is difficult to secure the movement space of the slide core described above, for example, when a portion of the space S on an outer peripheral side of the peripheral wall 52 and above the upper edge 52b is narrower than a portion below the upper edge 52b in the horizontal direction.

The peripheral wall 52 protrudes from the edge of the bottom wall 51, extends endlessly along the edge of the bottom wall 51, and surrounds the introduction room Ci. In other words, the peripheral wall 52 protrudes from a substantially entire periphery of the edge of the bottom wall 51. Accordingly, the peripheral wall 52 can prevent, for example, the brake fluid present in the introduction room Ci from flowing out of the introduction room Ci from an undesired place. Further, regarding the peripheral wall 52, rigidity of the peripheral wall 52 can be improved.

The peripheral wall 52 separates the filter room Cf and the introduction room Ci which are included in the space S in the horizontal direction. The second hole 86 is provided in the peripheral wall 52. The second hole 86 establishes communication between the introduction room Ci and the filter room Cf, and is positioned below the first hole 85. Accordingly, the brake fluid present in the introduction room Ci flows out from the introduction room Ci to the filter room Cf through the second hole 86. Meanwhile, when the fluid level of the brake fluid present in the introduction room Ci becomes higher than the upper edge of the peripheral wall 52, the brake fluid flows out from the introduction room Ci to the bypass room Cb through the first hole 85. That is, through the first hole 85, the brake fluid can be discharged from the introduction room Ci to the bypass room Cb when the fluid level of the brake fluid present in the introduction room Ci exceeds a predetermined fluid level. Accordingly, in the reservoir tank 12, the fluid level of the brake fluid in the introduction room Ci can be prevented from exceeding a desired fluid level. Further, the desired fluid level can be easily changed, for example, by changing the length of the peripheral wall 52.

The partition wall 33 separates the introduction room Ci and the filter room Cf in the horizontal direction. The partition wall 33 is provided with the second slit 82 that opens to the lower edge 33b of the partition wall 33 and establishes communication between the introduction room Ci and the filter room Cf. At least the edge 82a of the second slit 82 and the peripheral wall 52 form the third hole 87 that establishes communication between the introduction room Ci and the filter room Cf. Accordingly, in the reservoir tank 12, a size of the hole (the second hole 86 and the third hole 87) that establishes communication between the introduction room Ci and the filter room Cf can be prevented from being limited by the length of the peripheral wall 52. In addition, in the reservoir tank 12, since the third hole 87 is formed by the combination of the second slit 82 and the inner cap 23, it is possible to improve the degree of freedom in design as compared with the case where the hole which establishes communication between the introduction room Ci and the filter room Cf is formed in the partition wall 33 by injection molding using, for example, the slide core.

As an example, the reservoir tank according to at least one of the embodiments described above includes an upper case; a lower case positioned below the upper case and coupled to the upper case; a partition wall extending from the upper case toward the lower case and separating, in a horizontal direction, a first room and a second room which are included in a space inside the upper case and the lower case coupled to each other; and a partition member having a first wall covering the first room from below, and a second wall protruding upward from the first wall and being in contact with the partition wall. The partition wall is provided with a first slit which opens to a lower edge of the partition wall and which establishes communication between the first room and the second room, and at least an edge of the first slit and the second wall form a first hole which establishes communication between the first room and the second room and which is positioned above the first wall. Therefore, as an example, a distance between the first wall and the first hole in the vertical direction can be easily changed by changing a length of the second wall. Meanwhile, when a hole that establishes communication between the first room and the second room is formed by, for example, injection molding using a slide core, a design of the reservoir tank is limited such that the reservoir tank provides a portion in which the slide core is movable. However, in the reservoir tank, the first hole having a high degree of freedom in arrangement can be formed by a combination of the first slit and the partition member. Accordingly, a degree of freedom in design of the reservoir tank can be improved.

In the reservoir tank, as an example, the second wall protrudes from an edge of the first wall, extends endlessly along the edge of the first wall, and surrounds the first room. Therefore, as an example, the second wall protrudes from a substantially entire periphery of the edge of the first wall, so that the second wall can prevent the fluid present in the first room from flowing out of the first room from an undesired place. Further, regarding the second wall, rigidity of the second wall can be improved.

In the reservoir tank, as an example, the second wall separates a third room and the first room which are included in the space in a horizontal direction, and is provided with a second hole which establishes communication between the first room and the third room and which is positioned below the first hole. Therefore, as an example, fluid present in the first room flows out from the first room to the third room through the second hole. Meanwhile, when a fluid level of the fluid present in the first room becomes higher than an upper edge of the second wall, the fluid flows out from the first room to the second room through the first hole. That is, when the fluid level of the fluid present in the first room exceeds a predetermined fluid level, the fluid can be discharged from the first room to the second room through the first hole. Accordingly, in the reservoir tank, the fluid level of the fluid in the first room can be prevented from exceeding a desired fluid level. Further, the desired fluid level can be easily changed, for example, by changing the length of the second wall.

In the reservoir tank, as an example, the partition wall separates the first room and the third room in the horizontal direction, the partition wall is provided with a second slit which opens to the lower edge of the partition wall and which establishes communication between the first room and the third room, and at least an edge of the second slit and the second wall form a third hole which establishes communication between the first room and the third room. Therefore, as an example, in the reservoir tank, a size of the hole (the second hole and the third hole) which establishes communication between the first room and the third room can be prevented from being limited by the length of the second wall. In addition, in the reservoir tank, since the third hole is formed by a combination of the second slit and the partition member, it is possible to improve the degree of freedom in design as compared with the case where the hole which establishes communication between the first room and the third room is formed by injection molding using, for example, the slide core.

A reservoir tank according to at least one embodiment described above includes, as an example, a pressure adjustment device configured to pressurize or depressurize a brake fluid, and the above reservoir tank connected to the pressure adjustment device and configured to store the brake fluid. Therefore, as an example, the degree of freedom in design of the reservoir tank can be improved.

In the above description, prevention is defined as, for example, preventing occurrence of an event, operation, or influence, or reducing a degree of the event, operation, or influence.

Although embodiments of the reservoir tank and brake hydraulic pressure generator disclosed here have been described, the above embodiment and modifications are presented by way of example only, and are not intended to limit the scope of the disclosure. The above embodiment and modifications can be implemented in various other forms, and various omissions, replacements, combinations, and modifications can be made without departing from the gist of the disclosure. Configurations and shapes of the embodiments and modifications may be partially replaced.

The invention claimed is:

1. A reservoir tank comprising:
an upper case;
a lower case positioned below the upper case and coupled to the upper case;
a partition wall extending from the upper case toward the lower case and separating, in a horizontal direction, a first room and a second room which are included in a space inside the upper case and the lower case coupled to each other; and
a partition member having a first wall covering the first room from below, and a second wall protruding upward from the first wall and being in contact with the partition wall, wherein
the partition wall is provided with a first slit which opens to a lower edge of the partition wall and which establishes communication between the first room and the second room, and
at least an edge of the first slit and the second wall form a first hole which establishes communication between the first room and the second room and which is positioned above the first wall.

2. The reservoir tank according to claim 1, wherein
the second wall protrudes from an edge of the first wall, extends endlessly along the edge of the first wall, and surrounds the first room.

3. The reservoir tank according to claim 2, wherein
the second wall separates a third room and the first room which are included in the space in the horizontal direction, and is provided with a second hole which establishes communication between the first room and the third room and which is positioned below the first hole.

4. The reservoir tank according to claim 3, wherein
the partition wall separates the first room and the third room in the horizontal direction,
the partition wall is provided with a second slit which opens to the lower edge of the partition wall and which establishes communication between the first room and the third room, and
at least an edge of the second slit and the second wall form a third hole which establishes communication between the first room and the third room.

5. A brake hydraulic pressure generator comprising:
a pressure adjustment device configured to pressurize or depressurize a brake fluid; and
the reservoir tank according to a claim 4, the reservoir tank being connected to the pressure adjustment device and configured to store the brake fluid.

6. A brake hydraulic pressure generator comprising:
a pressure adjustment device configured to pressurize or depressurize a brake fluid; and
the reservoir tank according to claim 3, the reservoir tank being connected to the pressure adjustment device and configured to store the brake fluid.

7. A brake hydraulic pressure generator comprising:
a pressure adjustment device configured to pressurize or depressurize a brake fluid; and
the reservoir tank according to claim 2, the reservoir tank being connected to the pressure adjustment device and configured to store the brake fluid.

8. A brake hydraulic pressure generator comprising:
a pressure adjustment device configured to pressurize or depressurize a brake fluid; and
the reservoir tank according to claim 1, the reservoir tank being connected to the pressure adjustment device and configured to store the brake fluid.

* * * * *